May 31, 1949.   W. H. NEWBOLD   2,471,888
RADIO OBJECT LOCATION DEVICE
Filed Aug. 3, 1944
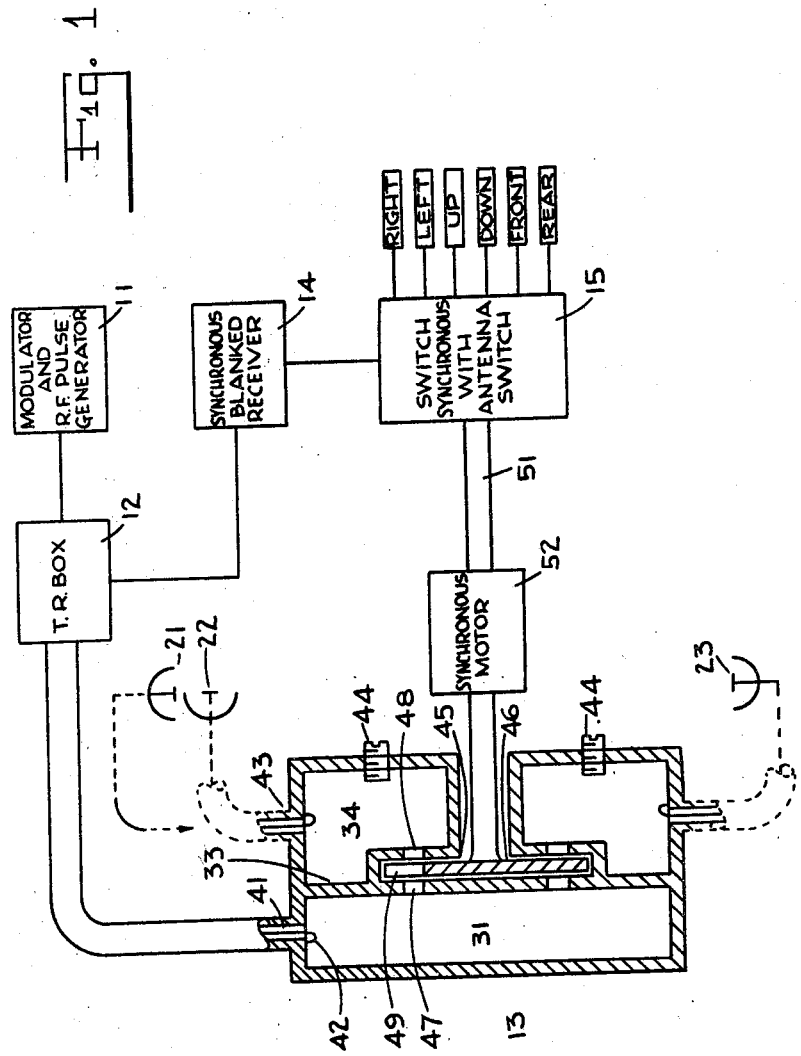
INVENTOR.
HANNAH M. NEWBOLD
Executrix of the last will and testament
of William H. Newbold, deceased.
BY
Ostrolenk and Faber
ATTORNEYS Patented May 31, 1949

2,471,888

UNITED STATES PATENT OFFICE 2,471,888

RADIO OBJECT LOCATION DEVICE

William H. Newbold, deceased, late of Langhorn, Pa., by Hannah M. Newbold, executrix, Langhorn, Pa., assignor, by mesne assignments, to Philco Corporation, Philadelphia, Pa., a corporation of Pennsylvania Application August 3, 1944, Serial No. 547,899

4 Claims. (Cl. 343—10)

This invention relates in general to the field of ultra-high frequency signalling and more particularly concerns a novel and improved proximity indicator system.

In conventional proximity indicating systems such as radar or the like, a series of high energy ultra-high frequency impulses are generated and transmitted from a directional antenna. A signal reflected from an object in the path of the transmitted wave is received and applied to suitable indicating circuits. The elapsed time between the transmitted and received impulses is utilized as a measure of the distance between the radar set and the reflecting object.

In order that the radar detection system completely covers all space, the transmitting antenna structure is generally rotated electrically or mechanically, and the position of the reflected wave upon the indicating circuits is synchronized with the rotating apparatus. These conventional radar proximity systems are, as is well known, comparatively heavy and unwieldy.

Difficulty has heretofore been encountered in the use of radar covering completely all space upon aircraft. This invention contemplates a simple microwave radar proximity indicating system which may readily be installed upon aircraft and which will provide three dimensional information of nearby objects in any space region.

The antenna systems utilized on the aircraft are fixed and may be disposed to cover any desired space region. For example, if six directional antenna structures are mounted upon the aircraft and if each antenna structure has a 90° beam pattern, then by directing one of these antennae up, down, right, left, front and rear, the entire three-dimensional space surrounding the aircraft will be covered by the radar transmission. The electrical system is essentially the conventional radar transmission and reception apparatus. Thus, a pulse generator and receiver are connected to a transmit-receive box which, as is well known, precludes distortion in the receiving circuit when the pulses are transmitted. The plurality of antennae systems previously mentioned is all linked to the single transmit-receive box or TR box through a novel high speed rotary switch.

The function of the rotary antenna switch is to successively connect the TR box to each of the six antenna structures. Synchronously operated with the rotary antenna switch is an indicating device for presenting the information received from each of the antenna systems. Accordingly, the operator of the aircraft radar system obtains directly information related to the presence of objects in the surrounding space region. The information, of course, may be presented to the operator directly upon a cathode ray screen, or in the form of a meter calibrated in terms of the range or other means to be described.

It is thus an object of the invention to provide a novel and improved proximity indication system.

Another object of the invention is to provide a radar system readily adapted to aircraft installation.

A further object of the invention is to provide a simple radar system operative from fixed antenna systems and providing information related to the existence of objects in surrounding space.

A still further object of the invention is to utilize a high speed rotary antenna switch in connection with a radar system operating with a plurality of fixed antenna structures.

These and other objects of the invention will now become apparent from the following specification taken in connection with the accompanying drawing in which:

The figure is a schematic block diagram of the radar system of the invention.

Referring now to the figure, there is shown schematically a conventional type radar pulse generation and reception system. Thus, an ultrahigh frequency oscillator and pulse modulator 11 is used to generate high energy pulses at the rate of approximately 1000 pulses per second. These high energy impulses are transmitted through TR box 12 to an antenna circuit selector switch 13, following which these pulses are radiated into space.

The signal received as a reflection from an object in space is returned through the antenna selector switch 13 and through the TR box 12 and impressed upon the receiver circuit 14. As is well understood in the art, the TR box 12 prevents the application of the high energy impulses generated in the pulsing circuit 11 upon the receiver circuit 14.

The time interval between the initiation of a high energy impulse in circuit 11 and the receipt of the reflected signal at the receiving circuit 14 is impressed upon an indicating circuit 15 and in this manner presents the operator with information concerning the presence of objects in space surrounding the set.

For the proximity indication system herein described, fixed antenna structures are utilized, thereby obviating the need for complex electromechanical antenna control systems. However, in order to cover a considerable space region, and to present the operator with a fairly accurate representation of the location of a reflecting object, a plurality of fixed antenna structures is required.

As illustrated in the figure, three such directional antenna systems are schematically illustrated, namely, antennae 21, 22 and 23, which will provide indications of objects down, forward and up respectively. It will be evident from a description of the switching mechanism utilized that there is no limitation to the number of fixed antenna structures which may be utilized.

The inventor has discovered that sufficiently accurate indications of the presence of surrounding objects may be obtained if six directional antennas are employed. These antennae are arranged to have approximately a 90° space beam radiation pattern. Thus, if these antennae are arranged to radiate and receive signals up, down, forward, rear, right and left, the entire space surrounding the radar set will be covered by the signal radiation.

In the operation of the proximity indication system disclosed in the figure, each of the fixed antenna structures such as 21, 22 and 23 is switched to the output of the TR box 12 for a sufficiently long period of time so that many high frequency impulses may be transmitted from the particular antenna. To provide this selective transmission from the various antenna systems used, the synchronous high frequency switch 13 is connected between the TR box 12 and the antenna structures.

The selector switch for ultra-high frequency is the subject of co-pending application Serial No. 547,898 of even date, now abandoned. However, in order to clarify the operation of the radar system disclosed, the switch 13 will be described briefly.

As illustrated in the figure, the ultra-high frequency switch 13 comprises essentially a cylindrical cavity resonator 31 having lower and upper circular metallic cover plates 32 and 33 respectively. Suitably secured to the upper cover plate 33 is a plurality of secondary cavity resonators 34 circularly disposed about plate 33. The number of secondary cavity resonators 34 is determined by the number of circuits it is desired to switch from the primary cavity 31. For the radar system described utilizing six directional antenna arrays, six cavity resonators 34 would be disposed about the periphery of the metallic plate 33.

As illustrated, a coaxial line couples the output of the TR box 12 to a coaxial connector 41 having a loop 42 at its end for energizing the primary cavity resonator 31. In a similar manner, each of the antenna structures such as 21, 22 and 23 is connected to one of the secondary cavities 34 by a coaxial connector 43. The secondary cavities 34 are tunable by screw plugs 44 to the operating frequency of the radar system. One end each of the secondary cavities 34 is notched at 45 to permit the passage of a circular thin metallic vane 46. Directly beneath the circular metallic vane 46, a small perforation 47 is provided as a coupling hole between the primary cavity 31 and each of the secondary cavities 34.

As illustrated in the figure, the perforations 47 and 48 between primary and secondary cavities are ordinarily sealed by the metallic vane 46. However, a notch 49 is provided in the periphery of the metallic vane 46 so dimensioned that each of the perforations 47 and 48 between the cavities may be successively uncovered as the vane 46 rotates. For operation of the radar system disclosed, the vane 46 is rigidly secured to a drive shaft 51 driven from a motor 52. It is thus evident that, upon continuous constant speed rotation of the vane 46, successive secondary cavities 34 will be coupled to the primary cavity 31.

In accordance with the previous description of the radar circuits, the continuous flow of ultra-high frequency impulses is applied to the primary cavity 31. This energy will be distributed to the high frequency directional antenna systems such as 21, 22 and 23 by the rotation of the vane 46. Thus, radiation from the antenna structures will occur in a predetermined sequence.

The ultra-high frequency selector switching system 13 is extremely simple and effective in operation. The mechanical movement required to switch the high frequency signal is, as schematically illustrated, reduced to a minimum. Accordingly, switching may be carried out at a comparatively high speed. Thus, if the radar high frequency impulses are generated at a frequency of the order of 1000 cycles per second, a switching frequency of 60 vane revolutions per second may be conveniently used. This switching frequency will permit a number of impulses to be transmitted from each antenna during the coupling of that particular antenna to the primary cavity by the opening in the vane. For the particular antenna connected to the radar system, the receiving circuit 14 will amplify and apply signals to the indicator 15 to indicate the distance to an object in that portion of space covered by the associated antenna.

As illustrated in the figure, the indicator system 15 is synchronized with the driving motor 52 for the vane switching element 46. The indicator system may comprise a plurality of indicators, one individual to each of the antenna structures. Each individual indicator is connected to the synchronously blanked receiver simultaneously with the connection of its associated antenna structure through the coupling of its resonant cavity to the main cavity. In this manner, the information received by a particular antenna such as the "up" antenna will be presented upon an indicator properly identified for the radar system operator. The indicator 15 may thus include switching apparatus designed to apply the signal received by a particular antenna to a corresponding indicator.

The range of the reflecting object in a particular direction may be indicated upon a suitably range calibrated instrument. Of course, the conventional cathode ray tube radar indicating system may be utilized for each of the impressed signals. In that case, the cathode ray tube indicating devices would require switching in synchronism with the rotation of the vane 46. A modified radar indicating device described in co-pending application Serial No. 547,900, of even date, illustrates the method of presenting three-dimensional proximity indications on a single cathode ray tube. It will be evident from the foregoing discussion that since the individual radiated beams are not sharply directional, that the presence of a reflecting object somewhat displaced from the axis of radiation of any one of the antennae will cause the receipt of a reflected signal upon three antenna systems. However, the intensity of the received reflected signal of any particular antenna will be an indication of the exact position with respect to the three axes over which the signal is received.

Summarizing the operation therefore of the novel radar system herein described, a conventional radar transmitter and receiver is utilized to generate signals, which signals are radiated from a plurality of directional antennae. Radiation occurs successively from the different antenna structures as determined by a high speed, high frequency switching selector circuit. The echo signals received over any particular antenna system are applied synchronously to an indicating device so that the operator of the radar system may have an indication of the range of a reflecting object in a particular direction.

The radar system described utilizes fixed antenna structures and provides three dimensional information. The system is comparatively simple and is thus suitable for aircraft installation.

It is evident that the foregoing disclosure may be subject to various modifications by those skilled in the art. It is therefore preferred that the scope of this invention be confined not by the specific disclosures presented but by the appended claims.

What is claimed is:

1. In a proximity indicator system, a plurality of fixed antenna structures each having a predetermined space radiation pattern, a signal generating and reception system, a switch comprising cavity resonators, and means including said switch for successively radiating signals from each of said antenna structures, an indicator, and means including said switch for operating said indicator in accordance with the signals received over said antenna structures.

2. In a proximity indicator system, six fixed antenna structures each having a 90° space radiation pattern arranged to radiate and receive signals respectively up, down, and forward, rear, right and left, covering the entire space surrounding said antenna structures, a signal generating and reception system, a switch comprising a primary and six secondary cavity resonators, and means including said switch for successively radiating signals from each of said antenna structures, an indicator, means including said switch for simultaneously operating said indicator in accordance with the signals received over each of said antenna structures, and means for operating said indicator to distinguish signals received over the respective antenna structures to indicate the direction and distance to a reflecting object.

3. In a proximity indicator system; a plurality of fixed antenna structures each having a predetermined space radiation pattern; a plurality of indicators, each individual to one of said antenna structures; a signal generating and reception circuit; a primary cavity resonator connected to said signal generating and reception circuit; a plurality of secondary cavity resonators, each of said secondary cavity resonators being individual to and connected to one of said antenna structures; means for successively coupling said secondary cavity resonators to said primary cavity resonator; and means for simultaneously connecting the associated indicator to said signal generating and reception circuit.

4. An antenna system comprising a plurality of fixed antennae arranged to have a predetermined space beam radiation pattern; a secondary cavity resonator individual to each antenna structure; a primary cavity resonator having an aperture connection with each of said secondary cavity resonators; and a rotatable vane for closing all but one of said apertures to provide successive coupling between said primary and each secondary resonator.

HANNAH M. NEWBOLD.
*Executrix of the Last Will and Testament of William H. Newbold, Deceased.*

REFERENCES CITED

The following references are of record in the file of this patent:

UNITED STATES PATENTS

| Number | Name | Date |
|---|---|---|
| 2,169,742 | Scharlau | Aug. 15, 1939 |
| 2,189,549 | Hershberger | Feb. 6, 1940 |